(12) United States Patent
Kondo et al.

(10) Patent No.: US 7,173,517 B2
(45) Date of Patent: Feb. 6, 2007

(54) VEHICLE SECURITY SYSTEM

(75) Inventors: Akihiro Kondo, Okazaki (JP); Ifushi Shimonomoto, Okazaki (JP); Toshio Shimomura, Chiryu (JP)

(73) Assignee: Denso Corporation, Kariya (JP)

( * ) Notice: Subject to any disclaimer, the term of this patent is extended or adjusted under 35 U.S.C. 154(b) by 278 days.

(21) Appl. No.: 10/974,687

(22) Filed: Oct. 28, 2004

(65) Prior Publication Data

US 2005/0122208 A1  Jun. 9, 2005

(30) Foreign Application Priority Data

Dec. 8, 2003   (JP) .............................. 2003-409237

(51) Int. Cl.
*H04Q 9/00* (2006.01)
*B60R 25/10* (2006.01)
*H01H 47/22* (2006.01)
*H01H 47/00* (2006.01)

(52) U.S. Cl. ............... 340/5.72; 340/5.22; 340/426.16; 340/426.11; 340/5.31; 340/5.61; 340/5.85; 340/425.5; 307/10.5; 307/10.2

(58) Field of Classification Search ............... 340/5.72, 340/5.22, 426.16, 426.11, 5.31, 5.61, 5.85, 340/425.5; 307/10.5, 10.2
See application file for complete search history.

(56) References Cited

U.S. PATENT DOCUMENTS

| 5,479,157 | A | * | 12/1995 | Suman et al. ............... 340/5.28 |
| 5,686,765 | A | * | 11/1997 | Washington ............... 307/10.5 |
| 6,525,643 | B1 | | 2/2003 | Okada et al. |
| 2002/0027501 | A1 | | 3/2002 | Yamanaka et al. |
| 2003/0160692 | A1 | * | 8/2003 | Nonaka ............... 340/539.11 |

FOREIGN PATENT DOCUMENTS

JP    A-2003-146185    5/2003

* cited by examiner

*Primary Examiner*—Jeffery Hofsass
*Assistant Examiner*—Scott Au
(74) *Attorney, Agent, or Firm*—Posz Law Group, PLC (57) ABSTRACT

When transmitting an instruction for activating an immobilizer function to a subject vehicle, a base station also transmits a given ID code for releasing the immobilizer function. An immobilizer ECU that receives the instruction and the given ID code, prohibits an engine from being started by other than a key having the given ID code. Therefore, a regular user alone, who owns a key having the given ID code, can start the engine.

13 Claims, 5 Drawing Sheets

VEHICLE SECURITY SYSTEM

CROSS REFERENCE TO RELATED APPLICATIONS

This application is based on and incorporates herein by reference Japanese Patent Application No. 2003-409237 filed on Dec. 8, 2003.

FIELD OF THE INVENTION

The present invention relates to a vehicle security system that enhances deterrence to an unauthorized use of a stolen vehicle, by using a wireless communications.

BACKGROUND OF THE INVENTION

There is proposed a vehicle security system that is designed to prevent an authorized use of a stolen vehicle by disabling the use of the vehicle or deter a robbery of a vehicle by openly disclosing that a vehicle is mounted with the function of disabling the use of the stolen vehicle.

This security system is equipped with an immobilizer function that is to be remotely activated. When a vehicle mounted with this system is stolen, the following takes place. A regular owner of the stolen vehicle reports the robbery of the vehicle to a base station. The base station thereby transmits to the stolen vehicle an instruction signal for activating the immobilizer function using a wireless communications. The vehicle that receives the instruction signal, then activates the immobilizer function so as to prohibit the engine from being started. Here, when the engine is running, the security system forcibly stops the running engine and then prohibits a re-starting of the engine, or, in view of safety, prohibits the re-starting of the engine after the running engine once stops (e.g., refer to Patent document 1).

In the above security system, releasing the activated immobilizer function after the stolen vehicle is sought out is performed so as to re-start the engine only by the following: a regular key addressing the immobilizer function; or transmission from the base station of an instruction signal that requests releasing of the immobilizer function.

Therefore, when the vehicle is stolen along with the regular key, the robber of the vehicle can release the immobilizer function, possibly decreasing the meaning of the immobilizer function. Further, when the instruction signal to release the function is transmitted from the base station but the stolen vehicle is under a situation where the vehicle cannot receive the transmitted instruction signal, the immobilizer function cannot be released. This incapability of receiving the signal by the vehicle occurs: when the vehicle is parked at a place such as a basement or a tunnel, where the no radio waves reach; or when the receiver mounted in the vehicle for the instruction signal is broken.

Patent document 1: JP 2003-146185 A

SUMMARY OF THE INVENTION

It is an object of the present invention to provide a vehicle security system where an immobilizer function is released only by a regular owner or an authorized person after a stolen vehicle is sought out. This system can function even when a regular key is stolen along with the vehicle, or even when the sought vehicle is located at a place where no radio waves reach.

To achieve the above object, a vehicle security system is provided with the following. A driving-device start unit that is portable is comprised to include an ID code, and be capable of starting, by transmitting the ID code, a driving device of a vehicle that is prohibited from being started. An ID-code reception unit is comprised to receive an ID code from the driving-device start unit. A base station is comprised to transmit a prohibition instruction for requiring a start prohibition that prohibits the driving device from being started. An instruction reception unit is comprised to receive the prohibition instruction transmitted by the base station. A control unit is comprised to execute the start prohibition based on the prohibition instruction received by the instruction reception unit and to release the start prohibition so as to enable the driving device to be started, based on the ID code received by the ID-code reception unit. Here, when the base station transmits the prohibition instruction, the base station transmits a given information piece relating to releasing the start prohibition. When the instruction reception unit receives the prohibition instruction and the given information piece transmitted by the base station, the control unit determines whether or not the driving device should be allowed to be started by a driving-device start unit having a given ID code that is associated with the given information piece.

In this structure, when an instruction signal for requiring activation of an immobilizer function is transmitted from the base station, given information for releasing the immobilizer function is simultaneously transmitted to the vehicle. Restart of the driving device such as an engine can be performed only by using the transmitted given information. Therefore, a third party (including the robber of the vehicle and its regular key) who does not know the given information, never re-start the driving device of the vehicle. Further, when a regular user of the vehicle re-starts the driving device of the vehicle, the user can do it by using a driving-device start unit having an authorized ID code that is set based on the given information transmitted from the base station. Further, this can be achieved regardless of whether the reception device of the sought-out vehicle is able to receive the signal from the base station.

BRIEF DESCRIPTION OF THE DRAWINGS

The above and other objects, features, and advantages of the present invention will become more apparent from the following detailed description made with reference to the accompanying drawings. In the drawings.

DETAILED DESCRIPTION OF THE PREFERRED EMBODIMENTS

Figure 1:
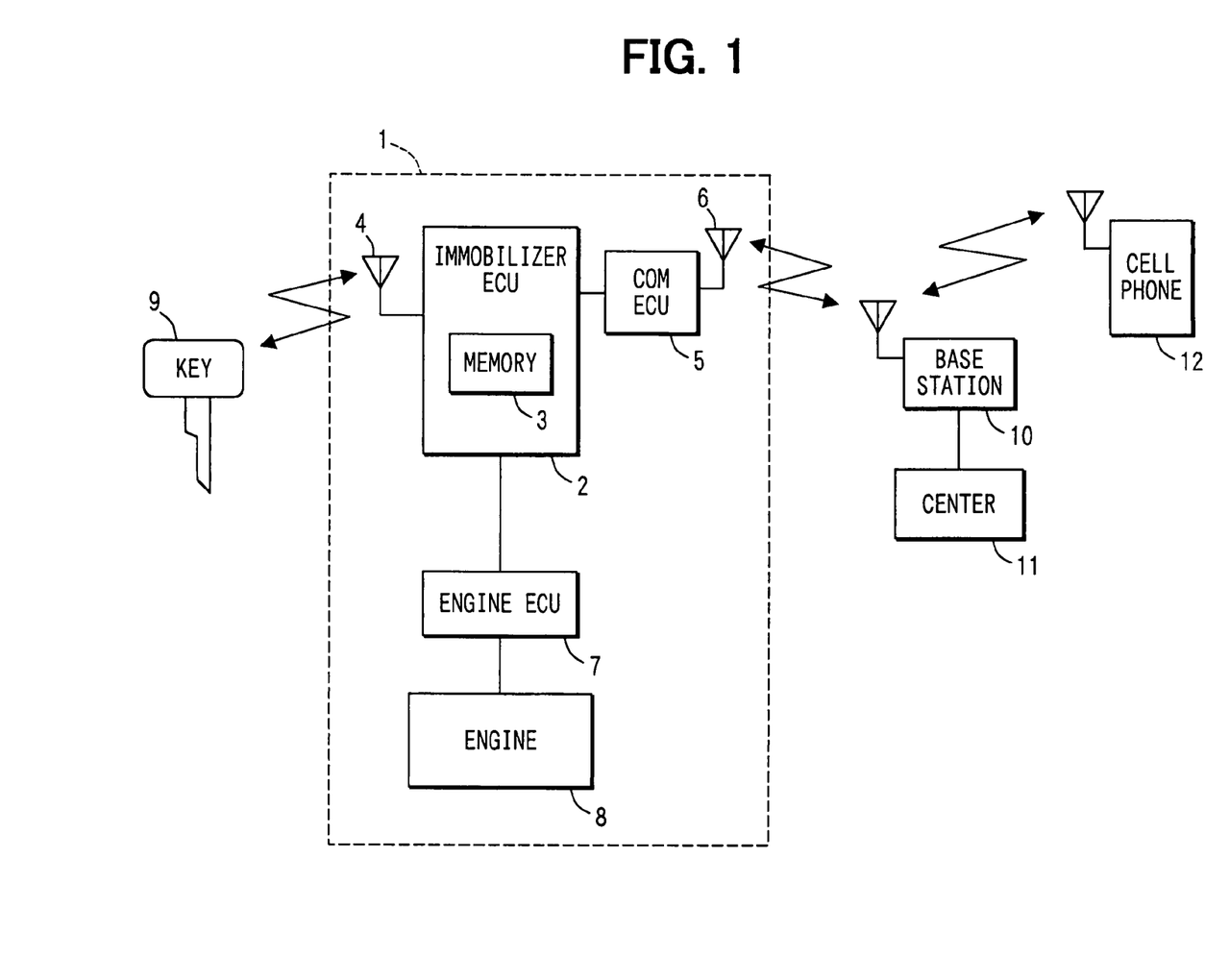
FIG. 1 is a diagram showing a schematic structure of a vehicle security system according to the present invention.

The present invention is directed to a vehicle security system mounted in a vehicle 1. As shown in FIG. 1 showing the schematic structure of the system, the system includes, as an in-vehicle system: a communications ECU 5, as an instruction reception unit, having an antenna 6 for wireless communications with a base station 10; an antenna 4, as an ID-code reception unit, for wireless communications with a key 9 that is compliant to an immobilizer of the vehicle 1; and an immobilizer ECU 2, as a control unit, that transmits to an engine ECU 7 a prohibition instruction for prohibiting an engine 8, as a driving device, from being started or a release instruction for releasing the start prohibition. The immobilizer ECU 2 includes a memory 3, as a storage, formed of a semiconductor unit.

The key 9 of the vehicle 1, as a driving-device start unit, includes a communications unit (not shown) having a unique ID code. The communications unit responds to a call signal from the antenna 4 to thereby transmit the ID code. The antenna 4 is disposed in proximity of a key slot (not shown) for starting the engine 8. The key slot contains a switch (not shown) that is turned on by the key 9 inserted therein to start the communications between the communications unit of the key 9 and the antenna 4.

The base station 10 is capable of performing wireless communications with the communications ECU 5 or a cell phone 12, being connected with a data center that manages a number of vehicle information.

The operational process of the thus structured vehicle security system includes four examples to be described below.

(First Example)

Figure 2:
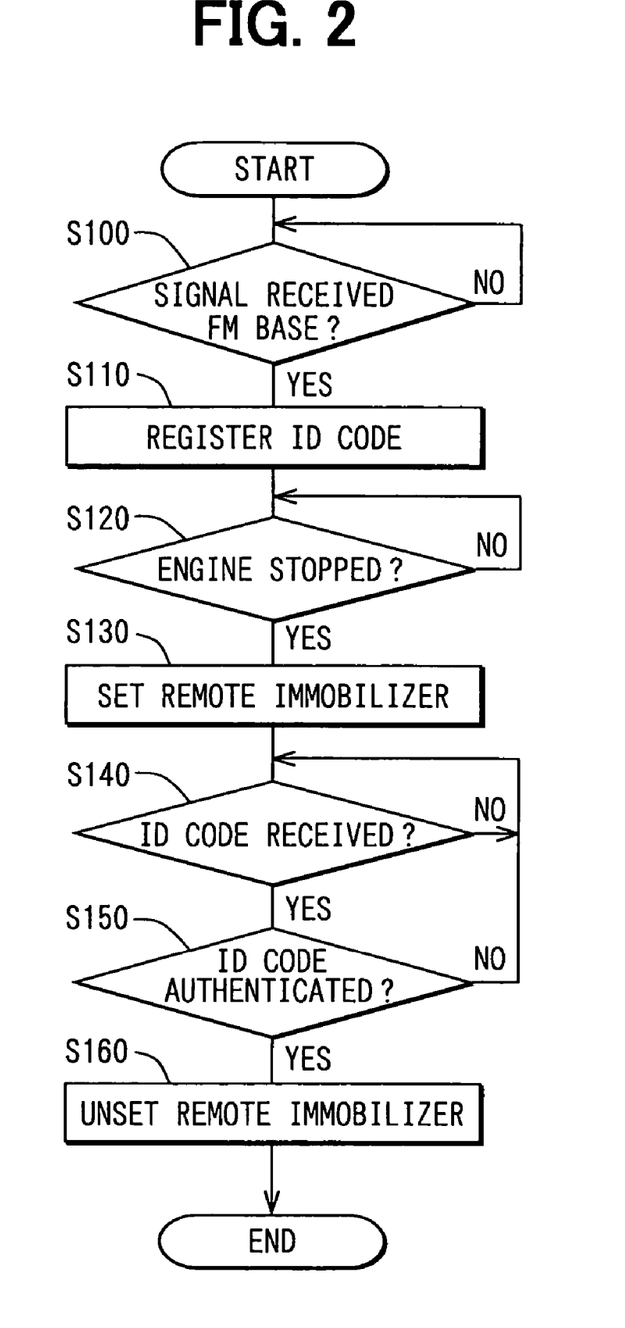
FIG. 2 is a flow chart diagram showing a process executed by an immobilizer ECU in a vehicle security system according to a first example of the present invention.

FIG. 2 is a flow chart diagram showing a process of a vehicle security system having a remote-activated immobilizer function that is remotely activated by a signal from the base station 10.

When the vehicle 1 is stolen, a user of the vehicle 1 has a communications with the base station 10 using a cell phone 12 to thereby report to the data center 11 the vehicle robbery.

The data center 11 that receives the report of the vehicle robbery transmits to the base station 10 a prohibition instruction of a start prohibition for prohibiting the engine 8 from being started, i.e., an activating instruction for activating a remote-activated immobilizer function, and an ID code for releasing the start prohibition, i.e., unsetting (or releasing) the remote-activated immobilizer function. The base station 10 that receives the foregoing transmits them to the vehicle 1.

When the antenna 6 receives the corresponding signal from the base station 10 (S100: YES), the immobilizer ECU 2 registers the ID code for unsetting in the memory 3 (S110).

The immobilizer ECU 2 determines an operating state of the engine 8 by communicating with the engine ECU 7. When the engine 8 is determined to be stopping or to come to stop after running (S120: YES), the immobilizer ECU 2 sets the remote-activated immobilizer function (S130).

Thereafter, when the user inserts the key 9 into the key slot after the stolen vehicle is sought out, the antenna 4 transmits a call signal. The key 9 that received the call signal transmits a response signal including an ID code.

When the antenna 4 receives the response signal (S140: YES), the immobilizer ECU 2 determines whether or not the received ID code accords with the ID code, for unsetting, registered in the memory 3 (S150).

As the result of determination, when the both IDs accord with each other, the immobilizer ECU 2 unsets (or releases) the remote-activated immobilizer function (S160).

Thereafter, when the user turns the key 9 to turn on the ignition switch, the engine 8 is to start.

In the above structure, when a vehicle is stolen, the engine of the vehicle can be started only by using the key compliant to the remote-activated immobilizer function, the key which is held by the user or is temporarily lent by a dealer or the like only in a case where the vehicle is stolen. This deters the repeated or additional unauthorized use of the vehicle. Further, the system can be constructed in such a manner that the engine can be started by a simple mechanical key that is not compliant to the remote-activated immobilizer function except for the case where the vehicle is stolen. Furthermore, the system does not require whether or not the vehicle can receive the signal from the base station when a regular user or an agent starts the engine of the vehicle after the stolen vehicle is sought out.

(Second Example)

Figure 3A:
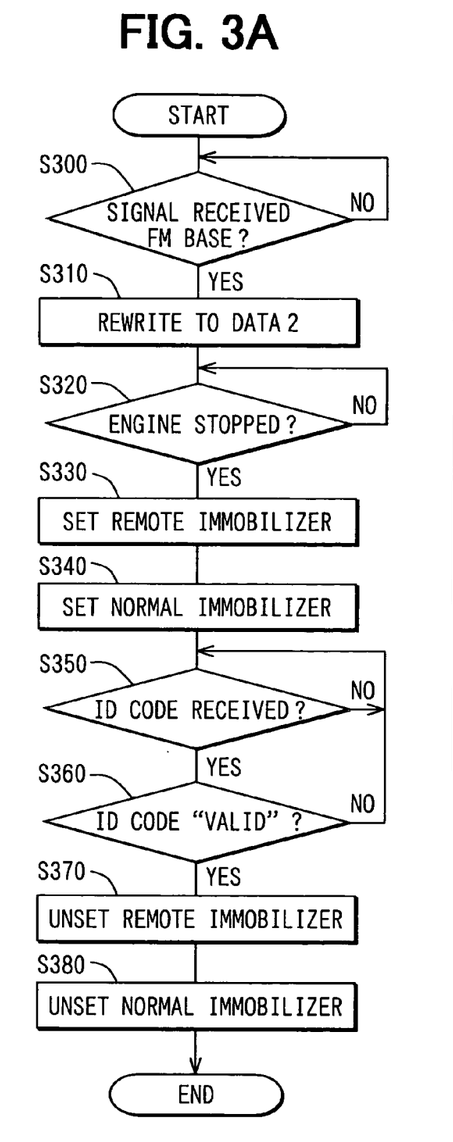
FIG. 3A is a flow chart diagram showing a process executed by an immobilizer ECU in a vehicle security system according to a second example of the present invention.

A second example whose structure is shown also in FIG. 1 will be explained further with reference to FIGS. 3A, 3B. The vehicle security system corresponding to the second example includes a normal immobilizer function in addition to the remote-activated immobilizer function explained in the first example. In the normal immobilizer function, the engine can be started only by a key that is compliant to an immobilizer and has an ID code that is previously registered, when a regular user starts the engine even in cases other than the vehicle robbery.

Figure 3B:
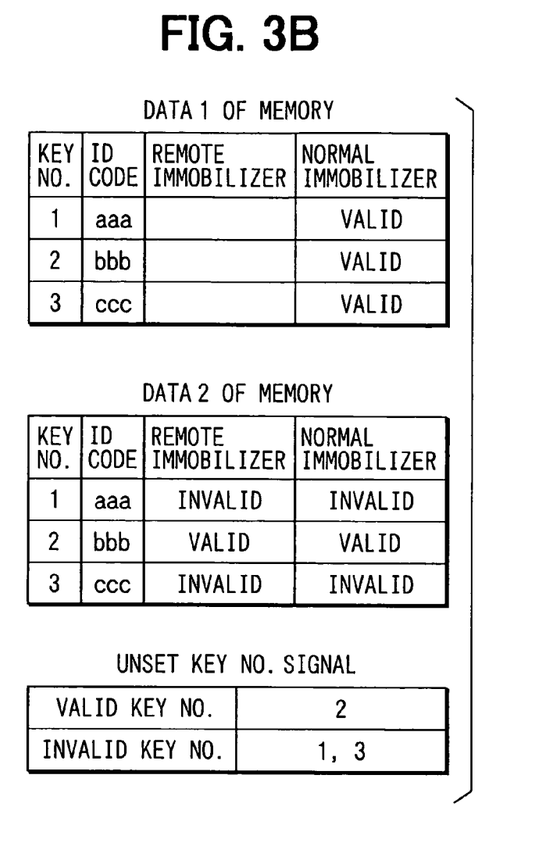
FIG. 3B is a table showing data in a memory and a part of signals transmitted from a base station, according to the second example.

The memory 3 in the vehicle security system stores registered information shown in DATA 1 OF MEMORY within FIG. 3B. The registered information includes three keys of Nos. 1, 2, 3, and corresponding ID codes and settings (valid, invalid, none (blank)) relating to the unsetting of the remote-activated or normal immobilizer functions. For instance, "VALID" in "NORMAL IMMOBILIZER" column or "REMOTE IMMOBILIZER" column indicates that the unsetting of the normal immobilizer function or the remote immobilizer function is possible by the corresponding key, respectively; "INVALID" in "NORMAL IMMOBILIZER" column or "REMOTE IMMOBILIZER" column indicates that the unsetting of the normal immobilizer function or the remote immobilizer function is impossible by the corresponding key, respectively; and none (blank) in "NORMAL IMMOBILIZER" column or "REMOTE IMMOBILIZER" column indicates that the unsetting of the normal immobilizer function or the remote immobilizer function is not set with respect to the corresponding key, respectively. In FIG. 3B, the keys having the ID codes of Nos. 1, 2, 3 are registered so that they can unset the normal immobilizer function.

When the vehicle 1 is stolen, the user of the vehicle 1 communicates with the base station 10 by using a cell phone 12 similarly to the first example. The data center 11 is thereby notified of the robbery of the vehicle 1.

The data center 11 that receives the notification of the robbery then transmits to the base station 10, in addition to a setting instruction for requiring setting of the remote-activated immobilizer function, unset key No. signals. Regarding the signals, refer to "UNSET KEY NO. SIG- NAL" in FIG. 3B. The signals designate a valid key No. that can unset the immobilizer function and an invalid key No. that cannot unset the immobilizer function. In this example, a key No. 2 is designated as "VALID," while key Nos. 1, 3 are designated as "INVALID."

The base station 10 that receives the setting instruction and the unset key No. signals, then transmits the instruction and signals to the vehicle 1.

When the antenna 6 receives the instruction and signals (S300: YES), the immobilizer ECU 2 rewrites data of the memory 3 such as data in "DATA 2 OF MEMORY" in FIG. 3B (S310).

Next, the immobilizer ECU 2 determines an operating state of the engine 8 by communicating with the engine ECU 7. When the engine 8 is determined to be stopping or to come to stop after running (S320: YES), the immobilizer ECU 2 sets the remote-activated immobilizer function (S330).

The immobilizer ECU 2 subsequently sets the normal immobilizer function (S340).

Thereafter, when the user inserts the key 9 having a key No. 2 ID code into the key slot after the stolen vehicle is sought out, the antenna 4 transmits a call signal. The key 9 that received the call signal transmits a response signal including the ID code (bbb).

When the antenna 4 receives the response signal (S350: YES), the immobilizer ECU 2 determines whether or not the received ID code is "VALID" in the remote-activated and normal immobilizer functions (S360).

As the result of determination, when the ID code is "VALID" (S360: YES), the immobilizer ECU 2 unsets the remote-activated immobilizer function (S370), and the normal immobilizer function (S380).

Thereafter, when the user turns the key 9 to turn on the ignition switch, the engine 8 is to start.

In the above structure, even when No. 1 key or No. 3 key is stolen in addition to the vehicle, the engine of the vehicle cannot be started by using the stolen key of No. 1 or No. 3. This deters the repeated or additional unauthorized use of the vehicle. Furthermore, the system does not require whether or not the vehicle can receive the signal from the base station when a regular user or an agent starts the engine of the vehicle after the stolen vehicle is sought out.

(Third Example)

Figure 4A:
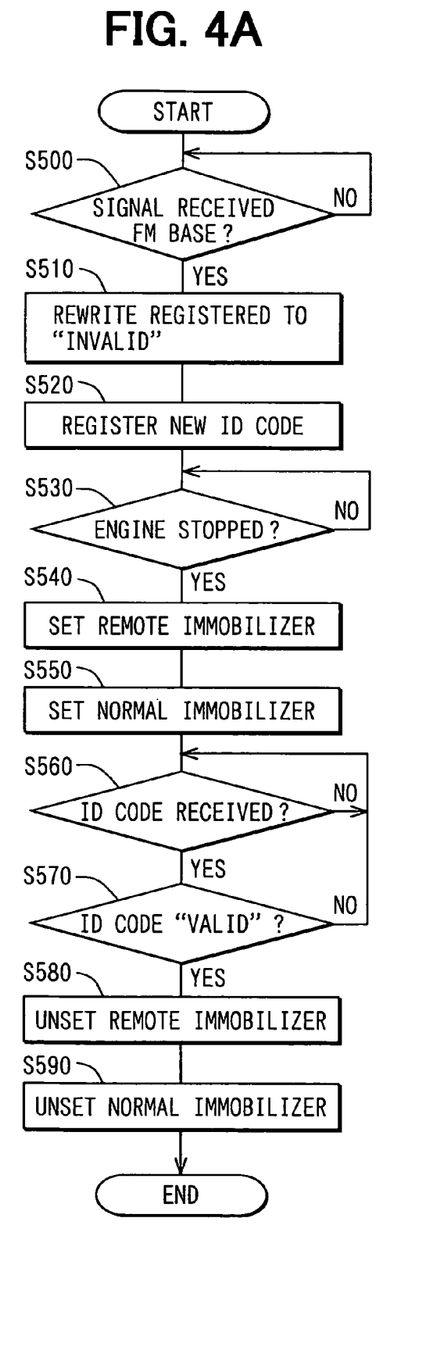
FIG. 4A is a flow chart diagram showing a process executed by an immobilizer ECU in a vehicle security system according to a third example of the present invention.

A third example whose structure is shown also in FIG. 1 will be explained further with reference to FIGS. 4A, 4B. Like the second example, the vehicle security system corresponding to the third example includes the remote-activated immobilizer function and the normal immobilizer function. Further, when an engine is started after a stolen vehicle is sought out, a new key that is prepared by a dealer or the like is used.

Figure 4B:
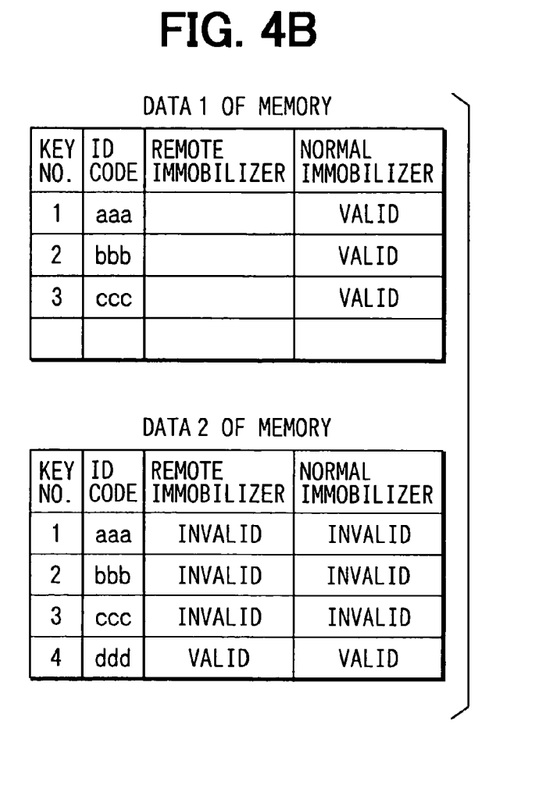
FIG. 4B is a table showing data in a memory according to the third example.

The memory 3 in the vehicle security system stores registered information shown in "DATA 1 OF MEMORY" within FIG. 4B, likewise the second example. The registered information includes three keys of Nos. 1, 2, 3, and corresponding ID codes and settings (valid, invalid, none (blank)) relating to the unsetting of the remote-activated or normal immobilizer functions. As explained in the second example, data of "DATA 1 OF MEMORY" shows that the normal or remote-activated immobilizer function can be unset or cannot be unset by which key No. (ID code). In FIG. 4B, the keys having the ID codes of key Nos. 1, 2, 3 are registered so that they can unset the normal immobilizer function.

When the vehicle 1 is stolen, the user of the vehicle 1 communicates with the base station 10 by using a cell phone 12 similarly to the first or second example. The data center 11 is thereby notified of the robbery of the vehicle 1.

The data center 11 that receives the notification of the robbery then transmits to the base station 10, in addition to a setting instruction for requiring setting of the remote-activated immobilizer function, an unsetting ID code that is used for unsetting and is not stored in the memory 3.

The base station 10 that receives the setting instruction and the unsetting ID code then transmits those signals to the vehicle 1.

When the antenna 6 receives the signals (S500: YES), the immobilizer ECU 2 updates data of the memory 3 such as data in "DATA 2 OF MEMORY" in FIG. 4B. That is, the ID codes of the previously registered keys (Nos. 1, 2, 3) are changed to "INVALID" in both in the remote-activated and normal immobilizer functions (S510), while the received unsetting ID code (ddd) is anew registered as No. 4 with "VALID" being designated in both the remote-activated and normal immobilizer functions (S520). The ID code (ddd) of the key No. 4 thereby becomes capable of unsetting both the remote-activated and normal immobilizer functions.

Next, the immobilizer ECU 2 determines an operating state of the engine 8 by communicating with the engine ECU 7. When the engine 8 is determined to be stopping or to come to stop after running (S530: YES), the immobilizer ECU 2 sets the remote-activated immobilizer function (S540).

The immobilizer ECU 2 subsequently sets the normal immobilizer function (S550).

Thereafter, when the user inserts the key 9 that is prepared by the dealer or the like and has a key No. 4 ID code into the key slot after the stolen vehicle is sought out, the antenna 4 transmits a call signal. The key 9 that received the call signal transmits a response signal including the ID code (ddd).

When the antenna 4 receives the response signal (S560: YES), the immobilizer ECU 2 determines whether or not the received ID code is "VALID" in the remote-activated and normal immobilizer functions (S570).

As the result of determination, when the ID code is "VALID" (S570: YES), the immobilizer ECU 2 unsets the remote-activated immobilizer function (S580), and the normal immobilizer function (S590).

Thereafter, when the user turns the key 9 to turn on the ignition switch, the engine 8 is to start.

In the above structure, even when all the keys owned by the user are stolen in addition to the vehicle, the engine of the vehicle can be started only by a key anew prepared by the dealer or the like.

(Fourth Example)

Figure 5A:
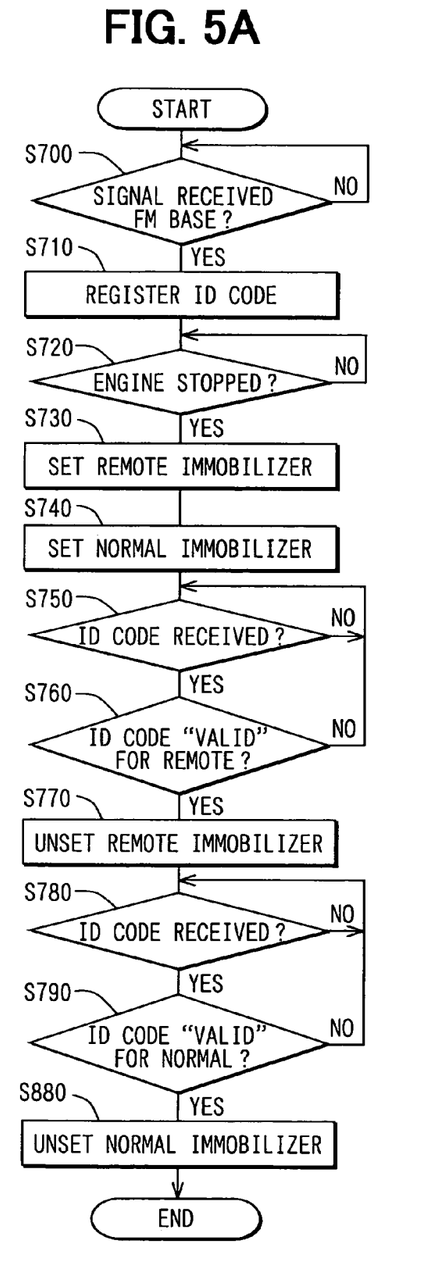
FIG. 5A is a flow chart diagram showing a process executed by an immobilizer ECU in a vehicle security system according to a fourth example of the present invention.

A fourth example whose structure is shown also in FIG. 1 will be explained further with reference to FIGS. 5A, 5B. Like the second example, the vehicle security system corresponding to the fourth example includes the remote-activated immobilizer function and the normal immobilizer function. Further, when an engine is started after a stolen vehicle is sought out, a key that is owned by a user and a new key that is prepared by a dealer or the like are used.

Figure 5B:
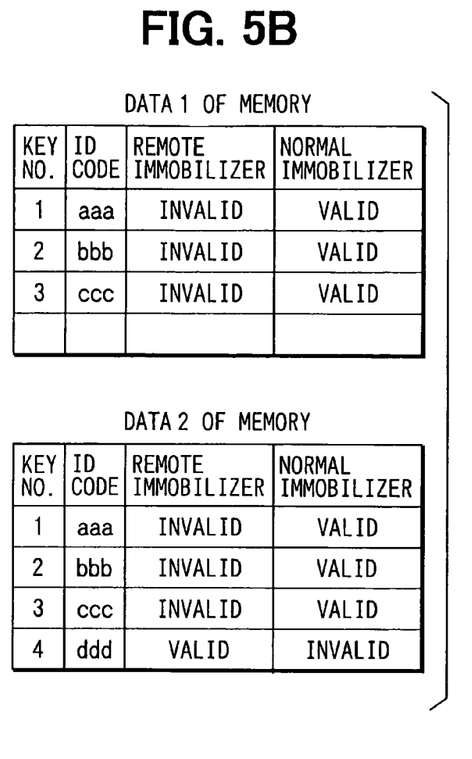
FIG. 5B is a table showing data in a memory according to the fourth example.

The memory 3 in the vehicle security system stores registered information shown in DATA 1 OF MEMORY within FIG. 5B, likewise the second example. In FIG. 5B, while the keys having the ID codes of Nos. 1, 2, 3 are registered as "VALID" in the normal immobilizer function, they are registered as "INVALID" in the remote-activated immobilizer function so that they cannot unset the remote-activated immobilizer function.

When the vehicle 1 is stolen, the user of the vehicle 1 communicates with the base station 10 by using a cell phone 12 similarly to the first example. The data center 11 is thereby notified of the robbery of the vehicle 1.

The data center 11 that receives the notification of the robbery then transmits to the base station 10, in addition to a setting instruction for requiring setting of the remote-activated immobilizer function, an unsetting ID code that is used for unsetting and is not stored in the memory 3.

The base station 10 that receives the setting instruction and the unsetting ID code then transmits those signals to the vehicle 1.

When the antenna 6 receives the signals (S700: YES), the immobilizer ECU 2 updates the data of the memory 3 such as data in "DATA 2 OF MEMORY" in FIG. 5B by registering the newly received ID code so as to be allowed to unset the remote-activated immobilizer function (S710).

Next, the immobilizer ECU 2 determines an operating state of the engine 8 by communicating with the engine ECU 7. When the engine 8 is determined to be stopping or to come to stop after running (S720: YES), the immobilizer ECU 2 sets the remote-activated immobilizer function (S730).

The immobilizer ECU 2 subsequently sets the normal immobilizer function (S740).

Thereafter, when the user inserts the key 9 that is prepared by the dealer or the like and has a key No. 4 ID code into the key slot after the stolen vehicle is sought out, the antenna 4 transmits a call signal. The key 9 that received the call signal transmits a response signal including the ID code (ddd).

When the antenna 4 receives the response signal (S750: YES), the immobilizer ECU 2 determines whether or not the received ID code is "VALID" in the remote-activated function (S760).

As the result of determination, when the ID code is "VALID" (S760: YES), the immobilizer ECU 2 unsets the remote-activated immobilizer function (S770).

When the user subsequently inserts a given key having an ID code of any one of key Nos. 1, 2, 3 into the key slot, the antenna 4 transmits a call signal. The given key that received the call signal transmits a response signal including the ID code (aaa, bbb, or ccc).

When the antenna 4 receives the response signal (S780: YES), the immobilizer ECU 2 determines whether or not the received ID code is "VALID" in the normal immobilizer function (S790).

As the result of determination, when the ID code is "VALID" (S790: YES), the immobilizer ECU 2 unsets the normal immobilizer function (S800).

Thereafter, when the user turns the given key to turn on the ignition switch, the engine 8 is to start.

In the above structure, the engine of the vehicle can be started only by both of the key owned by the user and the key anew prepared by the dealer or the like. This provides the user with significantly high security.

It will be obvious to those skilled in the art that various changes may be made in the above-described embodiments of the present invention. However, the scope of the present invention should be determined by the following claims.

What is claimed is:

1. A vehicle security system comprising:
   a driving-device start unit that is portable, includes an ID code, and capable of starting, by transmitting an ID code, a driving device of a vehicle that is prohibited from being started;
   an ID-code reception unit that receives an ID code from the driving-device start unit;
   a base station that transmits a prohibition instruction for requiring a start prohibition that prohibits the driving device from being started;
   an instruction reception unit that receives the prohibition instruction transmitted by the base station; and
   a control unit that executes the start prohibition based on the prohibition instruction received by the instruction reception unit and releases the start prohibition so as to enable the driving device to be started, based on the ID code received by the ID-code reception unit,
   wherein, when the base station transmits the prohibition instruction, the base station transmits a given ID code for releasing the start prohibition, and
   wherein, when the instruction reception unit receives the prohibition instruction and the given ID code transmitted by the base station, the control unit prohibits the driving device being started by other than a driving-device start unit having the given ID code.

2. A vehicle security system comprising:
   a driving-device start unit that is portable, includes an ID code, and capable of starting, by transmitting an ID code, a driving device of a vehicle that is prohibited from being started;
   an ID-code reception unit that receives an ID code from the driving-device start unit;
   a base station that transmits a prohibition instruction for requiring a start prohibition that prohibits the driving device from being started;
   an instruction reception unit that receives the prohibition instruction transmitted by the base station; and
   a control unit that executes the start prohibition based on the prohibition instruction received by the instruction reception unit and releases the start prohibition so as to enable the driving device to be started, based on the ID code received by the ID-code reception unit,
   wherein the control unit includes a storage unit that stores al least two ID codes,
   wherein the driving device is allowed to be started only by a driving-device start unit that includes at least one of the stored ID codes,
   wherein, when the base station transmits the prohibition instruction, the base station transmits a given signal for designating, of the stored ID codes, a given ID code as an ID code that is capable of releasing the start prohibition, and
   wherein, when the instruction reception unit receives the prohibition instruction and the given signal transmitted by the base station, the control unit prohibits the driving device from being started by other than a driving-device start unit having the given ID code.

3. A vehicle security system comprising:
   a driving-device start unit that is portable, includes an ID code, and capable of starting, by transmitting an ID code, a driving device of a vehicle that is prohibited from being started;
   an ID-code reception unit that receives an ID code from the driving-device start unit;
   a base station that transmits a prohibition instruction for requiring a start prohibition that prohibits the driving device from being started;
   an instruction reception unit that receives the prohibition instruction transmitted by the base station; and
   a control unit that executes the start prohibition based on the prohibition instruction received by the instruction reception unit and releases the start prohibition so as to enable the driving device to be started, based on the ID code received by the ID-code reception unit, wherein the control unit includes a storage unit that stores al least two ID codes, wherein the driving device is allowed to be started only by a driving-device start unit that includes at least one of the stored ID codes, wherein, when the base station transmits the prohibition instruction, the base station transmits a given signal for designating, of the stored ID codes, a given ID code as an ID code that is incapable of releasing the start prohibition, and wherein, when the instruction reception unit receives the prohibition instruction and the given signal transmitted by the base station, the control unit prohibits the driving device from being started by a driving-device start unit having the given ID code.

4. A vehicle security system comprising:

a driving-device start unit that is portable, includes an ID code, and capable of starting, by transmitting an ID code, a driving device of a vehicle that is prohibited from being started;

an ID-code reception unit that receives an ID code from the driving-device start unit;

a base station that transmits a prohibition instruction for requiring a start prohibition that prohibits the driving device from being started;

an instruction reception unit that receives the prohibition instruction transmitted by the base station; and a control unit that executes the start prohibition based on the prohibition instruction received by the instruction reception unit and releases the start prohibition so as to enable the driving device to be started, based on the ID code received by the ID-code reception unit, wherein the control unit includes a storage unit that stores al least two ID codes, wherein the driving device is allowed to be started only by a driving-device start unit that includes at least one of the stored ID codes, wherein, when the base station transmits the prohibition instruction, the base station transmits a given ID code that is different from the stored ID codes, as an ID code that is capable of releasing the start prohibition, and wherein, when the instruction reception unit receives the prohibition instruction and the given ID code transmitted by the base station, the control unit prohibits the driving device from being started by other than a driving-device start unit having the given ID code.

5. A vehicle security system comprising:

a driving-device start unit that is portable, includes an ID code, and capable of starting, by transmitting an ID code, a driving device of a vehicle that is prohibited from being started;

an ID-code reception unit that receives an ID code from the driving-device start unit;

a base station that transmits a prohibition instruction for requiring a start prohibition that prohibits the driving device from being started;

an instruction reception unit that receives the prohibition instruction transmitted by the base station; and a control unit that executes the start prohibition based on the prohibition instruction received by the instruction reception unit and releases the start prohibition so as to enable the driving device to be started, based on the ID code received by the ID-code reception unit, wherein the control unit includes a storage unit that stores al least two ID codes, wherein the driving device is allowed to be started only by a driving-device start unit that includes at least one of the stored ID codes, wherein, when the base station transmits the prohibition instruction, the base station transmits a given ID code that is different from the stored ID codes, as an ID code that is capable of releasing the start prohibition, and wherein, when the instruction reception unit receives the prohibition instruction and the given ID code transmitted by the base station, the control unit prohibits the driving device from being started by other than a driving-device start unit having the given ID code and the at least one of the stored ID codes.

6. A vehicle security system comprising:

a driving-device start unit that is portable, includes an ID code, and capable of starting, by transmitting an ID code, a driving device of a vehicle that is prohibited from being started;

an ID-code reception unit that receives an ID code from the driving-device start unit;

a base station that transmits a prohibition instruction for requiring a start prohibition that prohibits the driving device from being started;

an instruction reception unit that receives the prohibition instruction transmitted by the base station; and a control unit that executes the start prohibition based on the prohibition instruction received by the instruction reception unit and releases the start prohibition so as to enable the driving device to be started, based on the ID code received by the ID-code reception unit, wherein, when the base station transmits the prohibition instruction, the base station transmits a given information piece relating to releasing the start prohibition, and wherein, when the instruction reception unit receives the prohibition instruction and the given information piece transmitted by the base station, the control unit determines whether or not the driving device should be allowed to be started by a driving-device start unit having a given ID code that is associated with the given information piece.

7. The vehicle security system of claim 6, wherein the given information piece is the given ID code, and wherein, when the instruction reception unit receives the prohibition instruction and the given information piece, which is the given ID code, transmitted by the base station, the control unit prohibits the driving device from being started by other than the driving-device start unit having the given ID code.

8. The vehicle security system of claim 6, wherein the control unit includes a storage unit that stores at least two ID codes.

9. The vehicle security system of claim 8, wherein the given information piece is a given signal for designating, of the stored ID codes, a given ID code as an ID code that is capable of releasing the start prohibition, and wherein, when the instruction reception unit receives the prohibition instruction and the given signal transmitted by the base station, the control unit prohibits the driving device from being started by other than a driving-device start unit having the given ID code.

10. The vehicle security system of claim 8, wherein the given information piece is a given signal for designating, of the stored ID codes, the given ID code as an ID code that is incapable of releasing the start prohibition, and wherein, when the instruction reception unit receives the prohibition instruction and the given signal transmitted by the base station, the control unit prohibits the driving device from being started by a driving-device start unit having the given ID code.

11. The vehicle security system of claim 8,
wherein the given information piece is the given ID code that is different from the stored ID codes, as an ID code that is capable of releasing the start prohibition, and
wherein, when the instruction reception unit receives the prohibition instruction and the given ID code transmitted by the base station, the control unit prohibits the driving device from being started by other than a driving-device start unit having the given ID code.

12. The vehicle security system of claim 8,
wherein the given information piece is the given ID code that is different from the stored ID codes, as an ID code that is capable of releasing the start prohibition, and
wherein, when the instruction reception unit receives the prohibition instruction and the given ID code transmitted by the base station, the control unit prohibits the driving device from being started by other than a driving-device start unit having the given ID code and at least one of the stored ID codes.

13. The vehicle security system of claim 8,
wherein the given information piece is the given ID code that is different from the stored ID codes, as an ID code that is capable of releasing the start prohibition, and
wherein, when the instruction reception unit receives the prohibition instruction and the given ID code transmitted by the base station, the control unit allows driving device to be started only by both of a driving-device start unit having the given ID code and a driving-device start unit having at least one of the stored ID codes.

* * * * *